US012664179B2

(12) United States Patent
Colunga Sosa et al.

(10) Patent No.: US 12,664,179 B2
(45) Date of Patent: Jun. 23, 2026

(54) SUPPORTING PARTIAL JSON UPDATE IN REPLICATION ENVIRONMENT

(71) Applicant: Oracle International Corporation, Redwood Shores, CA (US)

(72) Inventors: Alfonso Colunga Sosa, Redwood City, CA (US); Zhen Hua Liu, San Mateo, CA (US); Ying Lu, Sunnyvale, CA (US); Yuhong Gu, Nashua, NH (US); Fernando Gutierrez Mendez, Zapopan (MX); Douglas James McMahon, Redwood City, CA (US); Mahesh Subramaniam, Foster City, CA (US); Michael Cusson, Woburn, MA (US)

(73) Assignee: Oracle International Corporation, Redwood Shores, CA (US)

( * ) Notice: Subject to any disclaimer, the term of this patent is extended or adjusted under 35 U.S.C. 154(b) by 4 days.

(21) Appl. No.: 18/620,905

(22) Filed: Mar. 28, 2024

(65) Prior Publication Data

US 2025/0307266 A1 Oct. 2, 2025

(51) Int. Cl.
*G06F 16/27* (2019.01)
*G06F 16/23* (2019.01)

(52) U.S. Cl.
CPC ........ *G06F 16/275* (2019.01); *G06F 16/2358* (2019.01)

(58) Field of Classification Search
CPC .... G06F 16/27; G06F 16/2358; G06F 16/835; G06F 2201/84; G06F 16/211; G06F 16/275; G06F 21/53
See application file for complete search history.

(56) References Cited

U.S. PATENT DOCUMENTS

| | | | | |
|---|---|---|---|---|
| 7,801,856 | B2 | 9/2010 | Warner et al. | |
| 7,853,573 | B2 | 12/2010 | Warner et al. | |
| 8,429,526 | B2 | 4/2013 | Sthanikam et al. | |
| 11,263,236 | B2 * | 3/2022 | Lee | G06F 16/273 |
| 11,341,317 | B2 * | 5/2022 | Liu | G06F 40/146 |
| 2018/0150499 | A1 * | 5/2018 | Lee | G06F 11/2038 |
| 2023/0224214 | A1 * | 7/2023 | Bhargava | H04L 41/0816 709/220 |

* cited by examiner

*Primary Examiner* — Marcin R Filipczyk
(74) *Attorney, Agent, or Firm* — Hickman Becker Bingham Ledesma LLP; Stephen J. Walder, Jr.

(57) ABSTRACT

An approach for replicating changes to JSON objects uses "piecewise replication". In piecewise replication, a piecewise update to a JSON object is replicated at a destination DBMS to a replica of the JSON object. A piecewise update changes part of JSON objects and typically changes a JSON object at the field level; a piecewise update does not overwrite an entire JSON object with an entire new JSON object, as in the full rewrite of a JSON object previously described. In piecewise replication, new values/content of the fields for change fields and a specification of the fields are transmitted from a source DBMS to a destination DBMS to effect a change to part of a JSON object.

20 Claims, 6 Drawing Sheets

```
JSST = update jtable set jtable.jcol =
json_transform( jtable.jcol,
                set '$.a' = 5,
                remove '$.b');

{   "table" : "JTABLE"
    "primary key" : "400"
    "manipulation op", "JSON_transform"
    "hash" : "E212196AAA"
    "modification ops" : [
        {   "type" : "set"
            "path" : "$.a" }
        {   "type" : "remove"
            "path" : "$.b" }]
    "values" : [
        {   "content" : "5"}]
}
```

UPDATE SPECIFICATION 201

FIG. 2

405 — READ LCR WITH UPDATE SPECIFICATION FOR A ROW

410 — LOOKUP UPDATE SPECIFICATION SIGNATURE IN CACHED MAPPING OF COMPILED CURSORS

IS IT MAPPED TO A CACHED CURSOR?

N

420 — COMPILE CACHED CURSOR WITH BIND VARIABLES

425 — ADD TO CURSOR CACHE

Y

430 — BIND VALUES SPECIFIED IN UPDATE SPECIFICATION TO CACHED CURSOR

435 — EXECUTE CURSOR

SUPPORTING PARTIAL JSON UPDATE IN REPLICATION ENVIRONMENT

FIELD OF THE INVENTION

The present disclosure relates to the storage of JavaScript object notation (JSON) objects in a database management system (DBMS), including relational DBMSs (RDBMS) and DBMSs that store collections of tables or documents, such as JSON objects.

BACKGROUND

JSON is a lightweight data specification language for formatting "JSON objects". A JSON object comprises a collection of fields, each of which is a field name/value pair. A field name is, in effect, a tag name for a node in a JSON object. The name of the field is separated by a colon from the field's value.

RDBMS vendors and No-SQL vendors both support JSON functionality to varying degrees. RDBMS vendors, in particular, support JSON text storage in a varchar or character large object (CLOB) column and apply structured query language (SQL) and/or JSON operators over the JSON text, as specified by the SQL/JSON standard. A RDBMS may also include a native JSON data type. A column may be defined as a JSON data type, and dot notation may be used to refer to JSON fields within the column. JSON operators may operate on a column having a JSON data type.

Like other database types, JSON objects are replicated between database systems. At a general level, there are two forms of replication: physical replication and logical replication. Physical replication replicates at a data block level. Data blocks may be data blocks in a file used by a DBMS to store database data, such as data for tables. Data blocks at a source DBMS are replicated as copies of the data blocks in a destination database. When a JSON object stored in a data block is changed, the change to the data block is replicated or applied in a copy of the data block at the standby database.

With logical replication, a JSON object in a source DBMS is replicated in a logical copy of the JSON object in a destination database. However, the copy of the JSON object is not stored in a copy of the data block that stores the JSON object at a source DBMS. Logical replication does not replicate data at the data block level.

An advantage of logical replication is that JSON objects may be replicated between databases that store JSON differently. For example, a JSON object stored at the source database may be stored in a compressed form using dictionary encoding but may be stored at the destination database in text form.

A current disadvantage of logical replication is that replicating partial updates to JSON objects requires processing and transmitting a greater amount of data, as explained further below. A partial update changes only a subset of fields in a JSON object. A JSON object can be large and stored in many data blocks. Under physical replication, a partial update to a JSON object may change data in only a small set of one or more data blocks at the source database. Only changes to these data blocks are processed and replicated at the destination.

Under logical replication, partial updates to a JSON object at the source database are replicated by performing a "full rewrite" of the JSON object at the destination database. Thus, a partial update of JSON object that only changes part of the JSON objects nevertheless requires processing and transmitting data for the entire JSON object, writing the entire JSON object at the destination database.

BRIEF DESCRIPTION OF THE DRAWINGS

In the drawings:

FIG. 2 depicts an update specification according to an embodiment of the present invention.

DETAILED DESCRIPTION

In the following description, for the purposes of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention. OVERVIEW Described herein is an approach to replicating changes to JSON objects refered to herein as piecewise replication. In piecewise replication, a piecewise update to a JSON object is replicated at a destination DBMS to a replica of the JSON object. A piecewise update changes part of JSON objects and typically changes a JSON object at the field level; a piecewise update does not overwrite an entire JSON object with an entire new JSON object, as in the full rewrite of a JSON object previously described. In piecewise replication, new values/content of the fields for change fields and a specification of the fields are transmitted from a source DBMS to a destination DBMS to effect a change to part of a JSON object.

Figure 1:
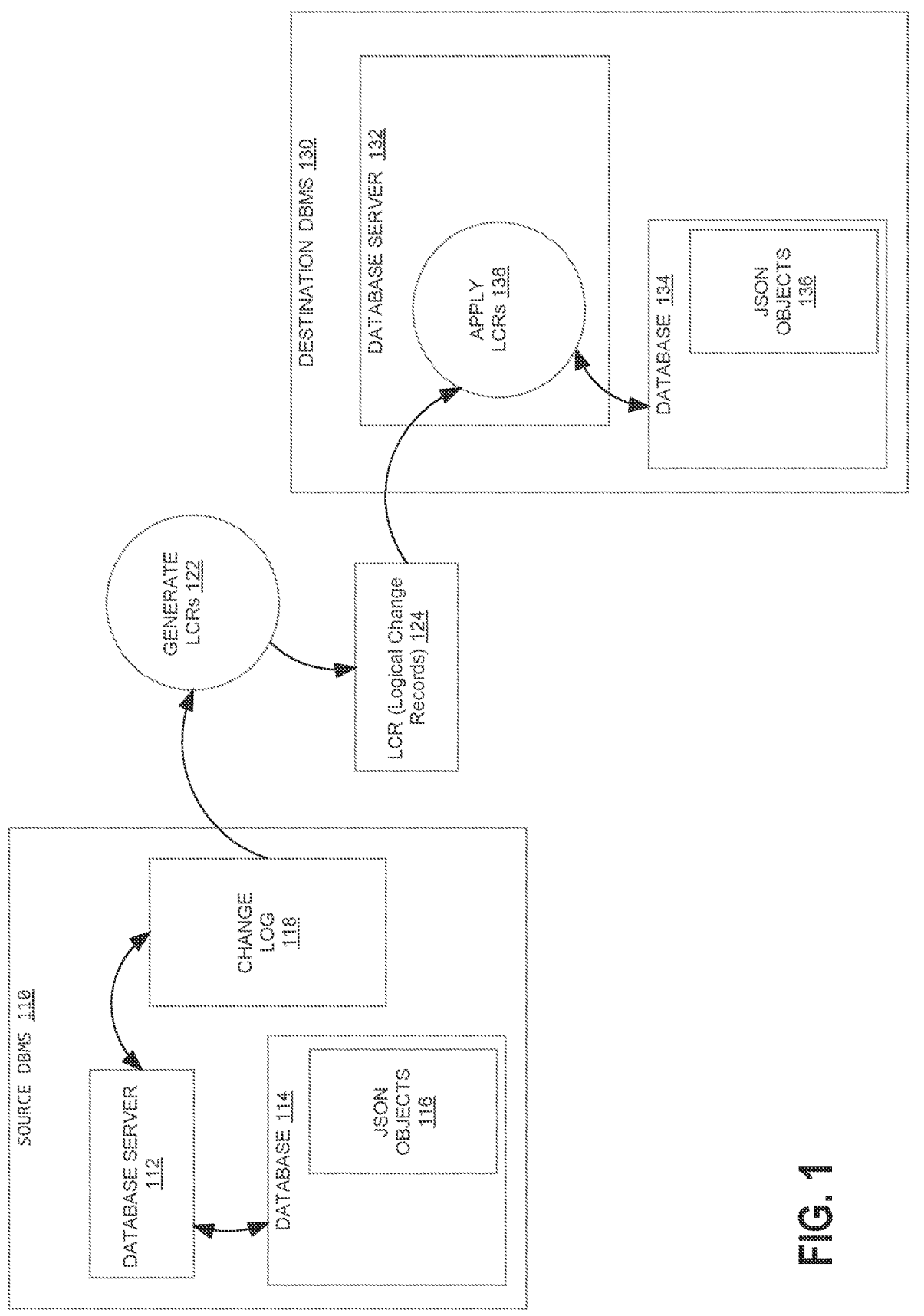
FIG. 1 depicts DBMSs arranged is a logical replication system according to an embodiment of the present invention.

As compared to replication of JSON objects that uses a full rewrite, the overhead of processing and transmitting data for an entire JSON object, writing the entire JSON object at the destination database is avoided, thereby improving the performance of database systems in general and the replication of JSON objects in particular. Logical Replication System FIG. 1 depicts a system of logical database replication according to an embodiment. Specifically, FIG. 1 depicts source DBMS 110 and destination DBMS 130, which include database server 112 & database 114 and database server 132 & database 134, respectively. Database objects in database 114 are logically replicated in database 134. Among the database objects replicated are JSON objects 116 in database 114, which are replicated as JSON objects 136 in database 134. In an embodiment, JSON objects 116 and 136 are stored in a column of a table.

Database 114 is changed by database transactions executing on source DBMS 110. The changes made by the database transactions are recorded in change log records stored in change log 118. The change log records in change log 118 record changes at a physical level and logical level. Physical level means a change log record changes specifies changes to specific data blocks that store records of a database object. Logical level means changes are specified to a logically identified row and/or to specific columns in the row or specific fields in a JSON object stored in the row. For example, the changes may be specified by including before and after change values for specific columns of a row and specifying the primary key value of the row.

To logically replicate changes to database objects in database 114, logical change records 124 are generated from change log 118. (122) Logical change records 124 represent these changes at a logical level. Logical change records 124 may only record changes made to a subset of database objects in database 114, such as JSON objects 116. A logical change record may correspond to one or more change log records generated by a database transaction; the corresponding change log records are referred to as source change log records with respect to the logical change record. The database transaction that generated the change log records and made the changes specified by the change log record is referred to as the source database transaction with respect to the logical change records.

The logical change records are configured to be used by various kinds of destination DBMSs that replicate changes made at a source DBMS. The destination DBMS may run different database software from that which is executed on the source DBMS and may be different types of databases. For example, a source DBMS may be a relational DBMS, while a destination DBMS may be a document DBMS (described below).

Change log records stored in change log 118 are generated by database processes executing database transactions as the database processes make changes to database objects. Before a database transaction commits, the change log records generated by the database transaction are persisted; the change log records persisted for the commit of a database transaction include change log records recording information at the logical level. In this way, the creating and/or persisting of the change log records for a database transaction is more or less performed synchronously with the changes made by the database transaction and the commit of the database transaction.

On the other hand, logical change records are generated asynchronously relative to when the respective changes in a database occur. (122) In fact, logical change records for a respective source database transaction may not be created until the source database transaction is committed.

Apply logical change records 138 comprises one or more database processes ("apply processes") that apply logical change records 124 to database 134. In general, applying logical change records entails the applying processes scanning the logical change records to generate database commands that effect the changes specified by the logical change records "apply commands" and then executing the apply commands at a source DBMS within "apply database transactions". As shall be described in further detail, piecewise updates are replicated on replica JSON objects by forming and executing apply commands that specify the piecewise updates on the replica JSON objects.

JSON objects 116 may be stored in a different storage format than JSON objects 136. For example, JSON objects 116 may be stored in compressed storage format in a column of a table, while JSON objects 136 are stored as character objects. An example compressed storage format is OSON, which is described in (1) U.S. Pat. No. 10,262,012, *Tech-*

*niques Related to Binary Encoding of JSON documents to Support Efficient Path Navigation of the JSON documents,* which is incorporated herein by reference in entirety, and (2) *Closing the Functional and Performance Gap Between SQL and NoSQL,* SIGMOD '16, which is incorporated herein by reference in entirety. Alternatively, JSON objects 136 may stored in a document DBMS, such as MongoDB®.

While the logical database replication system depicted in FIG. 1 shows two DBMSs that each run on a database server, an embodiment of the present invention is not so limited. A logical database replication system may include any number of DBMSs that include any number of database servers; in addition, any number of change record logs and logical change record logs may be generated by a logical database replication system.

JSON Manipulation Operators

According to an embodiment, piecewise updates are performed by executing database commands that specify piecewise updates to JSON objects. Such updates may be specified using a JSON manipulation operator, which are operators that, in effect, specify modifications to specific fields within a JSON object. Generally, a JSON manipulation operator includes the following input arguments. First is an input argument for a JSON object to modify. Second is one or more arguments that specify a modification operation and target within the input JSON object to which to apply the modification operation. A target is specified using a path expression. Database statement JSST below is an example of a database statement that includes a JSON manipulation operator JSON_TRANSFORM.

---

```
JSST = Update jtable set jtable.jcol =
    json_transform(
        jtable.jcol,
        set '$.a' = '5'
        remove '$.b',
        );
```

---

JSST is an update database statement specifying an update column jcol in table jtable.JSST assigns the output of the JSON manipulation operator JSON_TRANSFORM to jcol and takes jcol as the input argument for the input JSON object. Use of the JSON_TRANSFORM operator in the assignment causes a piecewise update to be performed on JSON objects stored in column jcol of the rows of table jtable.

The JSON_TRANSFORM operator takes as an input argument for a manipulation operation set '$.a'='5', which specifies to set the value of target field $. A to the value 5. The target is expressed as the path expression $. A. Another input argument for a manipulation operation is remove '$.b', which specifies to remove the target field '$.b'.

Illustrative Update Specification

As described later in further detail, when a database transaction makes a piecewise update to a JSON object, a change log record is generated that includes an update specification. An update specification includes sufficient information to form apply commands to replicate piecewise updates on a specific JSON object.

Referring to FIG. 2, it depicts illustrative update specification 201, an update specification that is generated for a row in jtable that is modified by execution of database statement JSST (also shown in FIG. 2). Update specification 201 is formatted in JSON and includes the following fields.

table: identifies the table subject to the piecewise update, which is jtable.

primary key: identifies the primary key of the row for which the update specification specifies a piecewise update.

manipulation op: identifies the type of manipulation operation to perform for the piecewise update, which in update specification 201 is JSON_TRANSFORM hash: hash value generated based on various fields in an update specification. It is used to identify an already compiled instance of an apply command that can be used to apply the update specification to the destination database. The hash value is referred to herein as an update specification signature.

modification ops: an array whose elements ("modification op elements") are objects that each specify attributes of a modification operation that do not include content or values assigned by a modification operation, if any. Such content or values are included in the array field values in an update specification, as explained later. Such values or content are referred to herein as field update values.

type: a field in a modification op element that specifies a particular kind of modification operation. In update specification 201, the type field in the first modification op element specifies a "set" and in the second a "remove".

path: a field in a modification op element that specifies the target of the respective modification operation of the modification op element.

values: an array whose elements ("value element") contain an object that specifies field update values assigned by a respective modification operation denoted in the modification op element.

content: A specific field update value.

Applying Piecewise Updates

Figure 3:
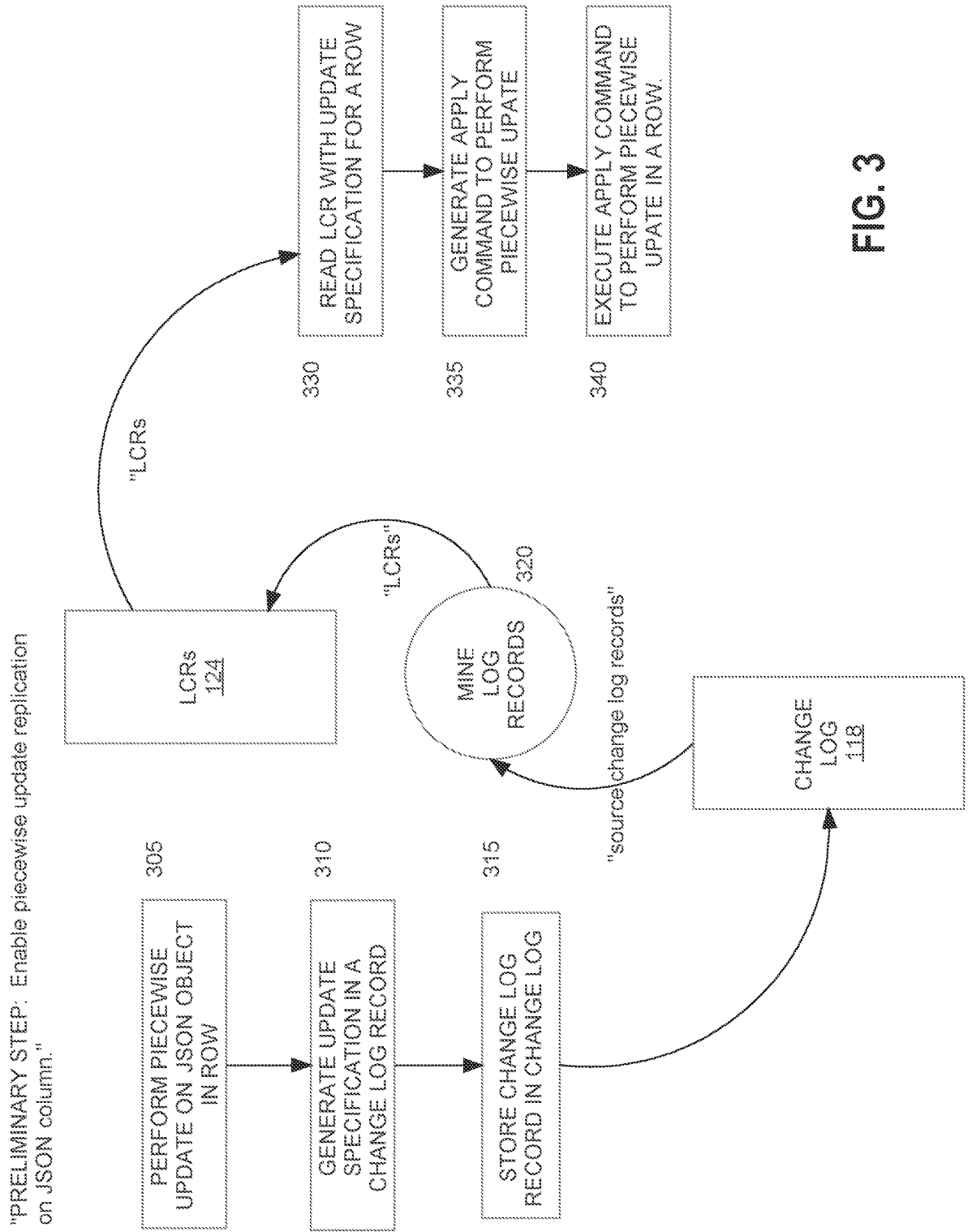
FIG. 3 depicts a procedure for logically replicating piecewise updates of JSON objects according to an embodiment of the present invention.

FIG. 3 depicts a procedure of logical replication of JSON objects that involves applying piecewise updates to JSON objects at a destination DBMS according to an embodiment. The procedure is performed as part of applying logical change records during logical replication. The operations depicted in FIG. 3 are described in the context of the system of logical replication depicted in the FIG. 1.

Referring to FIG. 3, source DBMS 110 performs operations 305-310. A piecewise update is performed on a JSON object in a JSON column of a row in a table. The piecewise update may be performed by source DBMS 110 while executing database statement JSST, which specifies a piecewise update to JSON objects in jcol using the previously described JSON_TRANSFORM operator.

Change log records are generated for the piecewise update to the JSON object stored in the jcol of the row. (310) These change log records include a change log record that includes an update specification, such as update specification 201. The change log records may also include change log records that specify changes to data blocks at the physical level that store the JSON object.

The change log records are persistently stored in a change log 118. (315) In general, the change log records are stored before a database transaction performing the piecewise update is committed.

Mine log records (320) scans change log 118 to generate logical change records 124 for logical replication. One or more database processes perform the mining. The logical change record generated from a source change log record, which includes an update specification, includes a copy of the update specification.

As mentioned previously, logical replication is performed for a subset of designated database objects in a database.

Such logical replication of a database object may be specified for a database object by issuing a DDL command specifying to perform logical replication for the database object and parameters for the logical replication. In an embodiment, logical replication of JSON objects in a JSON column is enabled by issuing DDL commands specifying to logically replicate the JSON objects. Enabling logical replication of JSON objects in a JSON column is thus performed as a preliminary step to the procedure depicted in FIG. 3.

In destination DBMS 130, the logical change record that contains a update specification is read from logical change records 124. (330) From the information in the logical change record, an apply command is generated. (335) The apply command is executed to logically replicate the piecewise update at the destination DBMS. (340)

The apply command may be similar to the database statement executed to perform the respective piecewise update at the source DBMS. However, apply commands are directed to a specific JSON object, while the database statement may be directed to a set of JSON objects, where the set is defined by, for example, a filter predicate. The apply command typically includes an additional predicate identifying a particular JSON object, such as a primary key value of a row that contains the JSON object.

Cached Compile Apply Commands

Subsets of apply commands issued against JSON objects at a destination DBMS are often identical except for the values that are assigned to fields by a manipulation operation. In an embodiment, apply commands are compiled using bind variables in place of the values so that the same compiled version of an apply command may be used for different piecewise updates at the destination database. The values specified in the update specification are bound to the bind variable in the compiled apply command, which is then executed.

A compiled database command can be stored as a compiled cursor. When an apply command is compiled that performs a piecewise update according to an update specification, it may be cached in a cursor cache for subsequent reuse. This avoids the overhead of recompiling apply commands, thereby conserving computer resources to perform piecewise updates during logical replication.

To identify cached compile cursors that may be used to apply a piecewise change specified by an update specification, a cached cursor mapping is maintained at a destination DBMS. The mapping maps update specification signatures of update specifications to cache cursors in the cursor cache for which respective apply commands of update specification signatures have been compiled. The update specification signature of a particular update specification is referred to herein as an update specification signature. The update specification signature is generated by applying a hash function to the fields in the update specification that corresponds to an invariant part of an apply command that uses bind variables; these fields include the modifications ops array (which represents the type of manipulation operation and path), the manipulation op field (which specifies the type of operator), and the table field. An update involving a JSON object may update another JSON column and JSON object and may update non-JSON columns. The update specification signature used to find a cached statement accounts for all JSON columns updated and the name and type of other updated non JSON columns.

Figure 4:
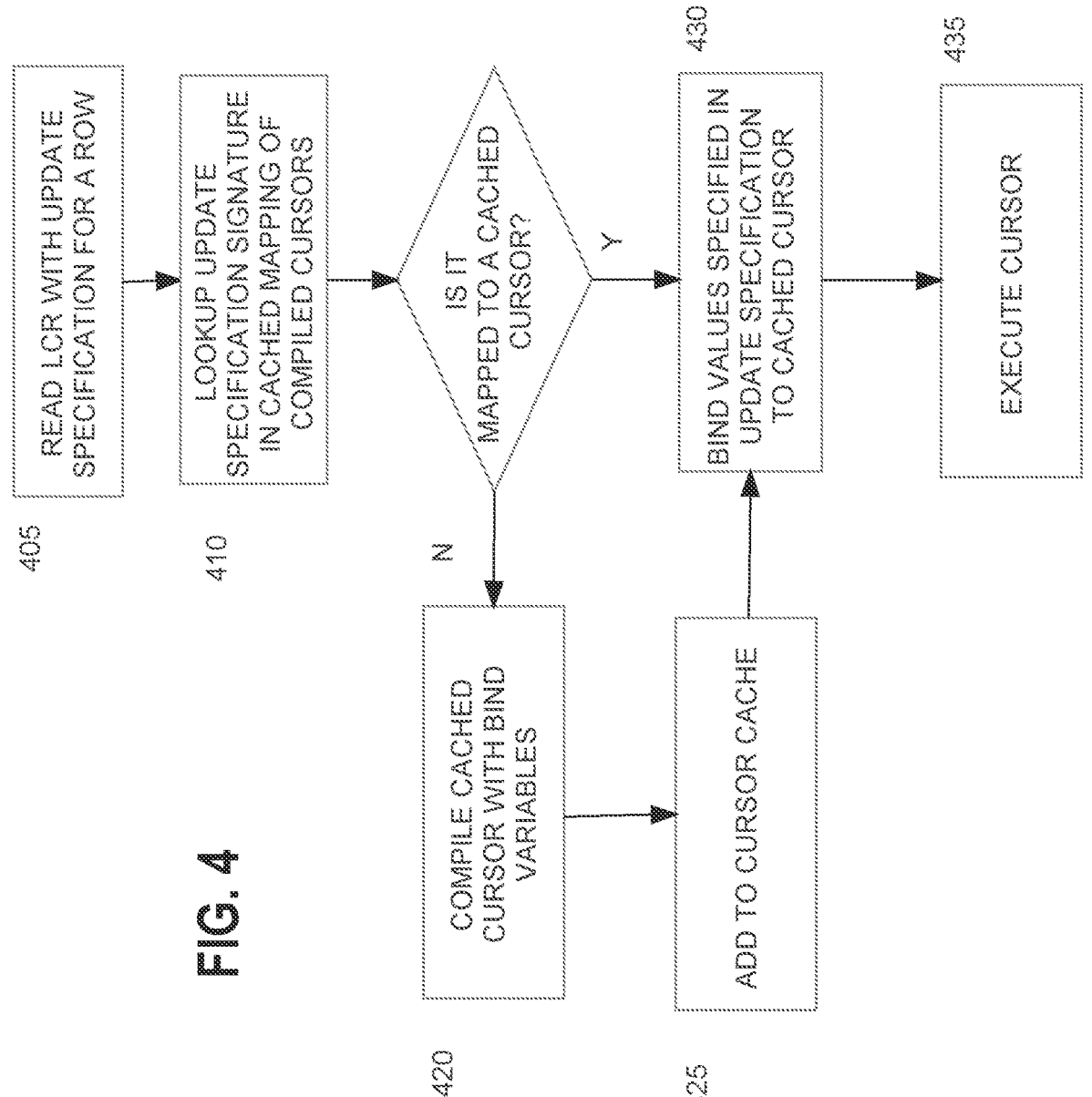
FIG. 4 depicts an accelerated procedure for replicating piecewise update to replicas of JSON objects at a source DBMS according to an embodiment of the present invention.

FIG. 4 is a diagram depicting an apply procedure that uses a cursor cache for logical replication of piecewise updates to JSON objects. The procedure is performed at a destination DBMS. Referring to FIG. 4, a logical change record with an updated specification for a row is read. (405) A lookup in the cached cursor mapping of the respective update specification signature is performed. (410) If, based on the lookup, the source DBMS determines the update specification signature is mapped to a cached cursor, then the field update values in the update specification are bound to the bind variables of the cached cursor. (430) The cursor is then executed. (435)

If, on the other hand, the source DBMS determines the update specification signature is NOT mapped to a cached cursor in the cached cursor mapping, a database command is formed based on the update specification, compiled with binding variables for use with field update values as input (420), and then stored in the cursor cache. (425) The field update values are bound to the bind variables of the cursor (430), and the cursor is then executed. (435)

DBMS Overview

A database management system (DBMS) manages a database. A DBMS may comprise one or more database servers. A database comprises database data and a database dictionary that are stored on a persistent memory mechanism, such as a set of hard disks. Database data may be stored in one or more collections of records. The data within each record is organized into one or more attributes. In relational DBMSs, the collections are referred to as tables (or data frames), the records are referred to as records, and the attributes are referred to as attributes. In a document DBMS ("DOCS"), a collection of records is a collection of documents, each of which may be a data object marked up in a hierarchical-markup language, such as a JSON object or XML document. The attributes are referred to as JSON fields or XML elements. A relational DBMS may also store hierarchically-marked data objects; however, the hierarchically-marked data objects are contained in an attribute of record, such as JSON typed attribute.

Users interact with a database server of a DBMS by submitting to the database server commands that cause the database server to perform operations on data stored in a database. A user may be one or more applications running on a client computer that interacts with a database server. Multiple users may also be referred to herein collectively as a user.

A database command may be in the form of a database statement that conforms to a database language. A database language for expressing the database commands is the Structured Query Language (SQL). There are many different versions of SQL; some versions are standard and some proprietary, and there are a variety of extensions. Data definition language ("DDL") commands are issued to a database server to create or configure data objects referred to herein as database objects, such as tables, views, or complex data types. SQL/XML is a common extension of SQL used when manipulating XML data in an object-relational database. Another database language for expressing database commands is Spark™ SQL, which uses a syntax based on function or method invocations.

A database command may also be in the form of an API call. The call may include arguments that each specifies a respective parameter of the database command. The parameter may specify an operation, condition, and target that may be specified in a database statement. A parameter may specify, for example, a column, field, or attribute to project, group, aggregate, or define in a database object.

In a DOCS, a database command may be in the form of functions or object method calls that invoke CRUD (Create Read Update Delete) operations. Create, update, and delete operations are analogous to insert, update, and delete operations in DBMSs that support SQL. An example of an API for such functions and method calls is MQL (MondoDB™ Query Language). In a DOCS, database objects include a collection of documents, a document, a view, or fields defined by a JSON schema for a collection. A view may be created by invoking a function provided by the DBMS for creating views in a database.

Changes to a database in a DBMS are made using transaction processing. A database transaction is a set of operations that change database data. In a DBMS, a database transaction is initiated in response to a database command requesting a change, such as a DML command requesting an update, insert of a record, or a delete of a record or a CRUD object method invocation requesting to create, update or delete a document. DML commands and DDL specify changes to data, such as INSERT and UPDATE statements. A DML statement or command does not refer to a statement or command that merely queries database data. Committing a transaction refers to making the changes for a transaction permanent.

Under transaction processing, all the changes for a transaction are made atomically. When a transaction is committed, either all changes are committed, or the transaction is rolled back. These changes are recorded in change records, which may include redo records and undo records. Redo records may be used to reapply changes made to a data block. Undo records are used to reverse or undo changes made to a data block by a transaction.

An example of such transactional metadata includes change records that record changes made by transactions to database data. Another example of transactional metadata is embedded transactional metadata stored within the database data, the embedded transactional metadata describing transactions that changed the database data.

Undo records are used to provide transactional consistency by performing operations referred to herein as consistency operations. Each undo record is associated with a logical time. An example of logical time is a system change number (SCN). An SCN may be maintained using a Lamporting mechanism, for example. For data blocks that are read to compute a database command, a DBMS applies the needed undo records to copies of the data blocks to bring the copies to a state consistent with the snap-shot time of the query. The DBMS determines which undo records to apply to a data block based on the respective logical times associated with the undo records.

When operations are referred to herein as being performed at commit time or as being commit time operations, the operations are performed in response to a request to commit a database transaction. DML commands may be auto-committed, that is, are committed in a database session without receiving another command that explicitly requests to begin and/or commit a database transaction. For DML commands that are auto-committed, the request to execute the DML command is also a request to commit the changes made for the DML command.

In a distributed transaction, multiple DBMSs commit a distributed transaction using a two-phase commit approach. Each DBMS executes a local transaction in a branch transaction of the distributed transaction. One DBMS, the coordinating DBMS, is responsible for coordinating the commitment of the transaction on one or more other database systems. The other DBMSs are referred to herein as participating DBMSs.

A two-phase commit involves two phases, the prepare-to-commit phase, and the commit phase. In the prepare-to-commit phase, branch transaction is prepared in each of the participating database systems. When a branch transaction is prepared on a DBMS, the database is in a "prepared state" such that it can guarantee that modifications executed as part of a branch transaction to the database data can be committed. This guarantee may entail storing change records for the branch transaction persistently. A participating DBMS acknowledges when it has completed the prepare-to-commit phase and has entered a prepared state for the respective branch transaction of the participating DBMS.

In the commit phase, the coordinating database system commits the transaction on the coordinating database system and on the participating database systems. Specifically, the coordinating database system sends messages to the participants requesting that the participants commit the modifications specified by the transaction to data on the participating database systems. The participating database systems and the coordinating database system then commit the transaction.

On the other hand, if a participating database system is unable to prepare or the coordinating database system is unable to commit, then at least one of the database systems is unable to make the changes specified by the transaction. In this case, all of the modifications at each of the participants and the coordinating database system are retracted, restoring each database system to its state prior to the changes.

A client may issue a series of requests, such as requests for execution of queries, to a DBMS by establishing a database session. A database session comprises a particular connection established for a client to a database server through which the client may issue a series of requests. A database session process executes within a database session and processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables and other information.

A database server includes multiple database processes. Database processes run under the control of the database server (i.e. can be created or terminated by the database server) and perform various database server functions. Database processes include processes running within a database session established for a client.

A database process is a unit of execution. A database process can be a computer system process or thread or a user-defined execution context such as a user thread or fiber. Database processes may also include "database server system" processes that provide services and/or perform functions on behalf of the entire database server. Such database server system processes include listeners, garbage collectors, log writers, and recovery processes.

A multi-node database management system is made up of interconnected computing nodes ("nodes"), each running a database server that shares access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

A database dictionary may comprise multiple data structures that store database metadata. A database dictionary may, for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the attribute names and data types of the attributes, and one or more files or portions thereof that store data for the table. Metadata in the database dictionary defining a procedure may specify a name of the procedure, the procedure's arguments and the return data type, and the data types of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user-defined function implemented in a JAVA class may be defined in part by the database dictionary by specifying the name of the user-defined function and by specifying a reference to a file containing the source code of the Java class (i.e. java file) and the compiled version of the class (i.e., class file).

Native data types are data types supported by a DBMS "out-of-the-box". Non-native data types, on the other hand, may not be supported by a DBMS out-of-the-box. Non-native data types include user-defined abstract types or object classes. Non-native data types are only recognized and processed in database commands by a DBMS once the non-native data types are defined in the database dictionary of the DBMS, by, for example, issuing DDL statements to the DBMS that define the non-native data types. Native data types do not have to be defined by a database dictionary to be recognized as a valid data types and to be processed by a DBMS in database statements. In general, database software of a DBMS is programmed to recognize and process native data types without configuring the DBMS to do so by, for example, defining a data type by issuing DDL statements to the DBMS.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
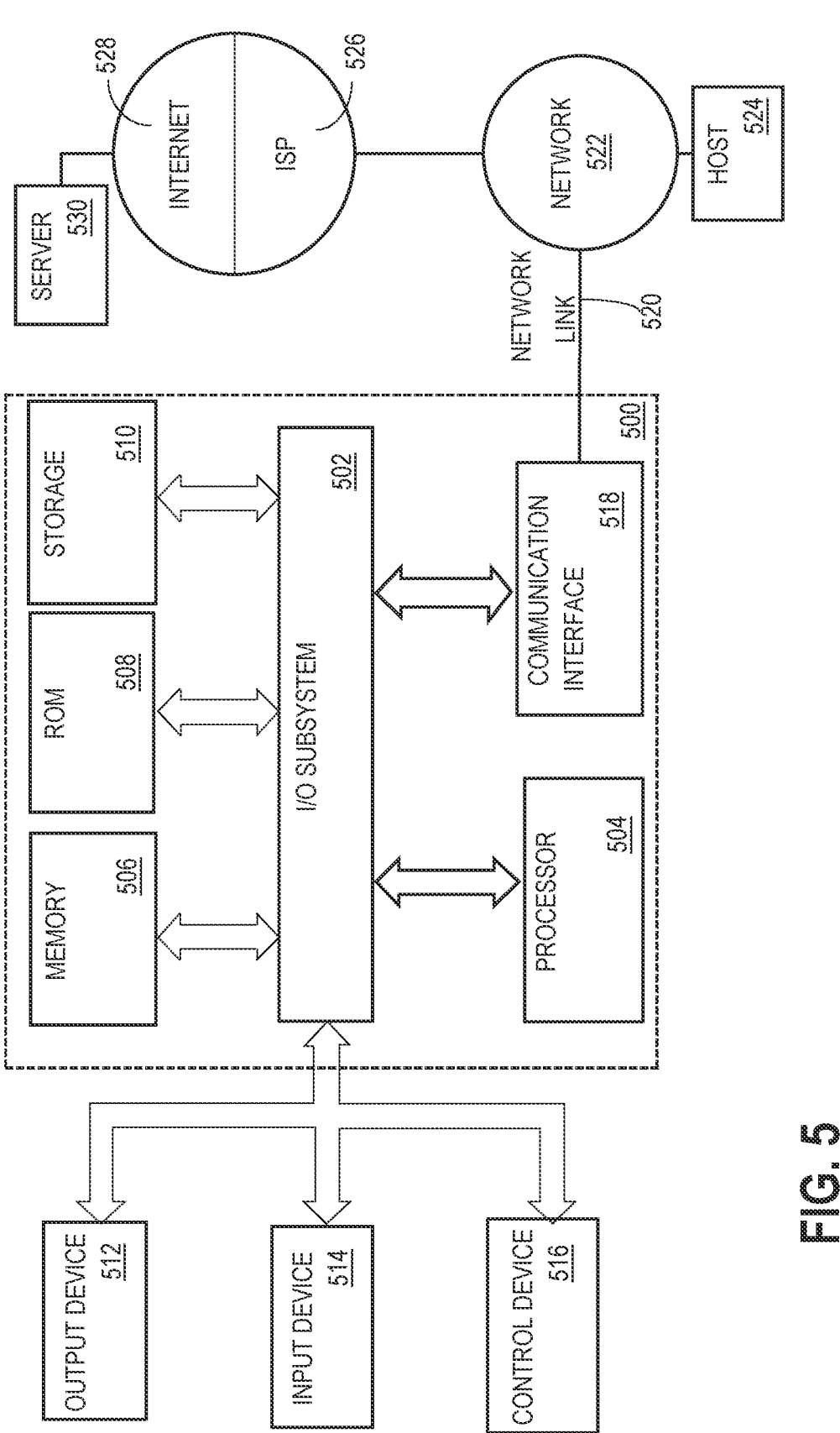
FIG. 5 depicts a computer system that may be used to implement an embodiment of the present invention.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Software Overview

Figure 6:
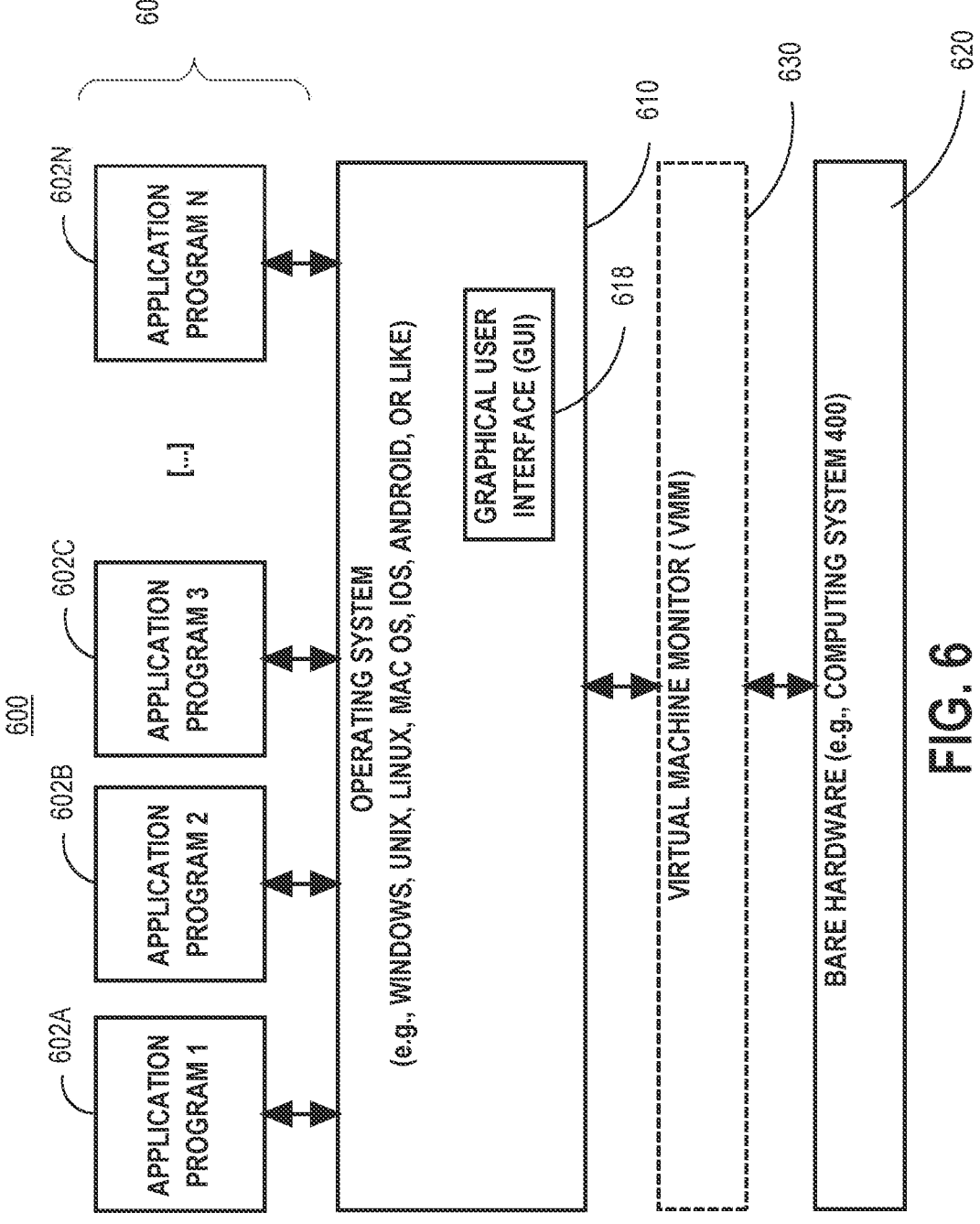
FIG. 6 depicts a software system that may be employed for controlling the operation a computer system.

FIG. 6 is a block diagram of a basic software system 600 that may be employed for controlling the operation of computer system 500. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computer system 500. Software system 600, which may be stored in system memory (RAM) 506 and on fixed storage (e.g., hard disk or flash memory) 510, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 510 into memory 506) for execution by the system 600. The applications or other software intended for use on computer system 500 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 504) of computer system 500. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the computer system 500.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of computer system 500 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A method comprising:

executing a source database transaction at a source Database Management System (DBMS), wherein executing said source database transaction includes performing a piecewise update on a set of JavaScript Object Notation (JSON) objects stored at the source DBMS and which are logically replicated as a set of replica JSON objects in a destination DBMS;

storing a logical change log corresponding to the piecewise update, wherein the logical change log comprises at least one update specification identifying attributes of the piecewise changes to the set of JSON objects; and replicating said piecewise update at the destination DBMS at least by applying said piecewise update to the set of replica JSON objects based on the logical change log and without entirely rewriting the set of replica JSON objects in the destination DBMS.

2. The method of claim 1, wherein executing said source database transaction includes generating a first update specification specifying piecewise changes to a first JSON object of said set of JSON objects, and wherein replicating said piecewise update includes:

generating a first apply command based on said first update specification; and executing the first apply command to replicate said piecewise update on a first replica JSON object in said set of replica JSON objects that is a replica of said first JSON object.

3. The method of claim 2, wherein executing said source database transaction includes generating a second update specification specifying a piecewise update to a second JSON object of said set of JSON objects, and wherein replicating said piecewise update includes:

generating a second apply command based on said second update specification; and executing said second apply command to replicate said piecewise update on a second replica JSON object that is a replica of said second JSON object.

4. The method of claim 2, wherein said piecewise update is specified by a JSON_TRANSFORM operator referenced in a database statement being executed by said source database transaction.

5. The method of claim 4, wherein said first update specification specifies a JSON_TRANSFORM and one or more manipulation operations of said JSON_TRANSFORM to perform on said first JSON object to replicate said piecewise update on said first replica JSON object.

6. The method of claim 2, wherein:

said first update specification includes field update values;

generating a first apply command based on said first update specification includes generating a compiled cursor having binding variables corresponding to said field update values; and executing said first apply command includes binding said field update values to said binding variables.

7. The method of claim 1, wherein the set of JSON objects is a subset of all database objects of the source DBMS, and wherein not all database objects in the source DBMS are logically replicated in the set of replica JSON objects in the destination DBMS.

8. The method of claim 1, wherein the logical change log is stored along with a physical change log in a change log storage, and wherein replicating the piecewise update comprises mining the change log storage for logical change log records that correspond to the set of JSON objects stored at the source DBMS.

9. The method of claim 8, wherein the mining of the change log storage is performed asynchronously relative to when the update on the set of JSON objects stored at the source DBMS occurs.

10. The method of claim 9, wherein the mining is performed after the source database transaction is committed.

11. The method of claim 1, wherein the update specification comprises:

a table identifier that identifies a table subject to the piecewise update, a primary key that identifies a primary key of a row for which the update specification specifies the piecewise update, a manipulation operation that identifies a type of manipulation operation to perform for the piecewise update, a modification operation specifying an array whose elements are objects that each specify attributes of a modification operation, a type that specifies a particular kind of modification operation, a path that specifies a target of the modification operation, and values that specify an array whose elements contain an object that specifies field update values assigned by the modification operation.

12. A method comprising:

executing a source database transaction at a source DBMS, wherein executing said source database transaction includes performing a piecewise update on a set of JSON objects stored at the source DBMS; and replicating said piecewise update at a destination DBMS by applying said piecewise update to a set of replica JSON objects stored in said destination DBMS as replicas of said set of JSON objects, wherein executing said source database transaction includes generating a first update specification specifying piecewise changes to a first JSON object of said set of JSON objects, and wherein replicating said piecewise update includes:

generating a first apply command based on said first update specification; and executing a first apply command to replicate said piecewise update on a first replica JSON object in said set of replica JSON objects that is a replica of said first JSON object, and wherein said first update specification includes field update values, generating a first apply command based on said first update specification includes generating a compiled cursor having binding variables corresponding to said field update values, and executing said first apply command includes binding said field update values to said binding variables, wherein the method further includes:

storing said compiled cursor in a cursor cache; and mapping within a cached cursor mapping an update specification signature generated based on said first update specification to said compiled cursor, wherein:

executing said source database transaction includes generating a second update specification specifying piecewise update to a second JSON object of said set of JSON objects;

replicating said piecewise update includes, in response to determining that an update specification signature in said second update specification is mapped to the compiled cursor, executing said compiled cursor, wherein executing said compiled cursor includes binding field update values in said second update specification to said bind variables.

13. The method of claim 1, wherein the logical change log comprises a first change log that includes a first update specification describing a piecewise update to a first JSON object of said set of JSON objects, wherein the method includes:

generating a set of logical change records based on said logical change log, wherein said set of logical change records includes a first logical change record that includes said first update specification; and said destination DBMS reading said first update specification from said first logical change record, and applying said piecewise update at least by performing a piecewise update based on said first update specification read from said first logical change record on a first replica JSON object that is a replica of said first JSON object.

14. The method of claim 13, wherein said set of logical change records includes a second update specification for a piecewise update on a second JSON object from said set of JSON objects, and wherein applying said piecewise update includes performing a piecewise update based on said second update specification on a second replica JSON object that is a replica of said second JSON object.

15. The method of claim 14, wherein said first JSON object and said first replica JSON object are stored in respective row have a same first primary key value; and said second JSON object and said second replica JSON object are stored in respective row have a same second primary key value that is different than said first primary key value.

16. One or more non-transitory computer-readable media storing instructions which, when executed by one or more processors, cause performance of:

executing a source database transaction at a source Database Management System (DBMS), wherein executing said source database transaction includes performing a piecewise update on a set of JavaScript Object Notation (JSON) objects stored at the source DBMS and which are logically replicated as a set of replica JSON objects in a destination DBMS;

storing a logical change log corresponding to the piecewise update, wherein the logical change log comprises at least one update specification identifying attributes of the piecewise changes to the set of JSON objects; and replicating said piecewise update at the destination DBMS at least by applying said piecewise update to the set of replica JSON objects based on the logical change log and without entirely rewriting the set of replica JSON objects in the destination DBMS.

17. The one or more non-transitory computer-readable media of claim 16, wherein executing said source database transaction includes generating a first update specification specifying piecewise changes to a first JSON object of said set of JSON objects, and wherein replicating said piecewise update includes:

generating a first apply command based on said first update specification; and executing the first apply command to replicate said piecewise update on a first replica JSON object in said set of replica JSON objects that is a replica of said first JSON object.

18. The one or more non-transitory computer-readable media of claim 17, wherein executing said source database transaction includes generating a second update specification specifying a piecewise update to a second JSON object of said set of JSON objects, and wherein replicating said piecewise update includes:

generating a second apply command based on said second update specification; and executing said second apply command to replicate said piecewise update on a second replica JSON object that is a replica of said second JSON object.

19. The one or more non-transitory computer-readable media of claim 16, wherein said piecewise update is specified by a JSON_TRANSFORM operator referenced in a database statement being executed by said source database transaction, and wherein said first update specification specifies a JSON_TRANSFORM and one or more manipulation operations of said JSON_TRANSFORM to perform on said first JSON object to replicate said piecewise update on said first replica JSON object.

20. The one or more non-transitory computer-readable media of claim 16, wherein the logical change log comprises a first change log that includes a first update specification describing a piecewise update to a first JSON object of said set of JSON objects, wherein the method includes:

generating a set of logical change records based on said logical change log, wherein said set of logical change records includes a first logical change record that includes said first update specification; and said destination DBMS reading said first update specification from said first logical change record, and applying said piecewise update at least by performing a piecewise update based on said first update specification read from said first logical change record on a first replica JSON object that is a replica of said first JSON object.

* * * * *